W. H. LARSEN.
DIRECTION INDICATOR.
APPLICATION FILED APR. 20, 1914.
1,223,183.
Patented Apr. 17, 1917.
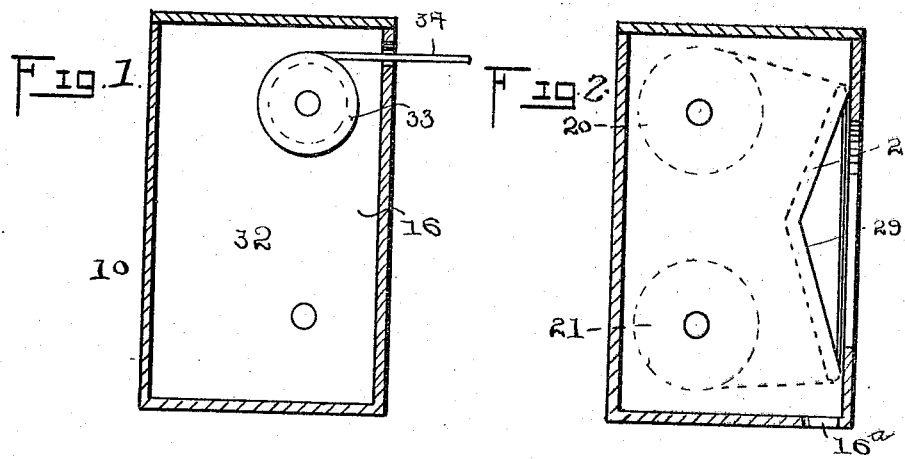
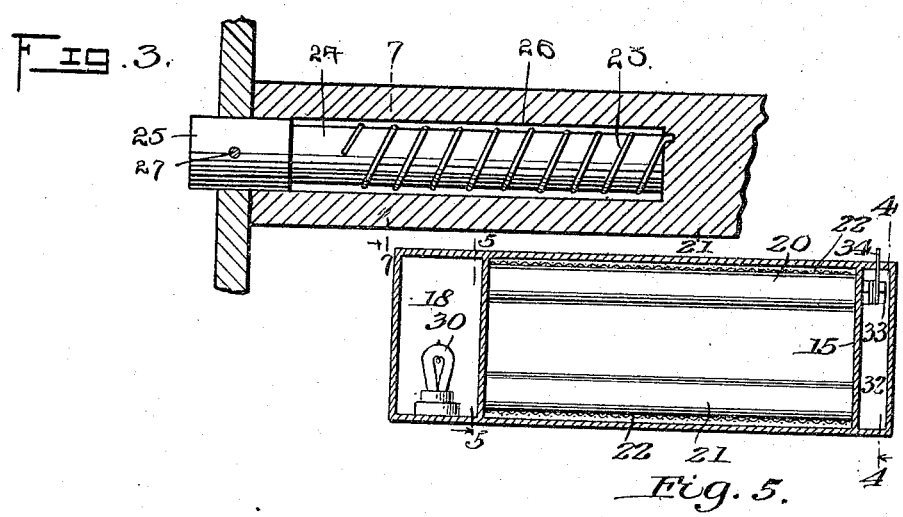
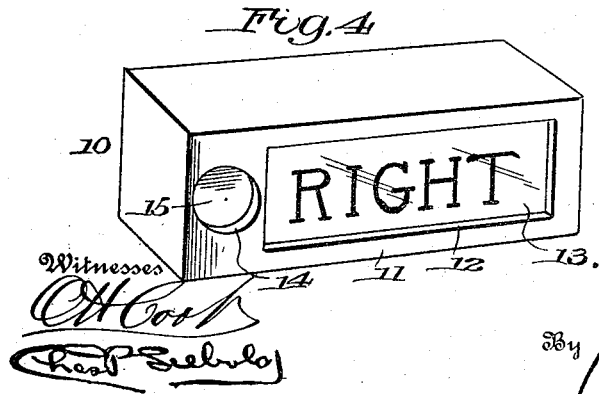
Inventor
William H. Larsen.

UNITED STATES PATENT OFFICE.

WILLIAM H. LARSEN, OF RACINE, WISCONSIN.

DIRECTION-INDICATOR.

1,223,183.  Specification of Letters Patent.  Patented Apr. 17, 1917.

Application filed April 20, 1914. Serial No. 833,088.

*To all whom it may concern:*

Be it known that I, WILLIAM H. LARSEN, a citizen of the United States, residing at Racine, in the county of Racine and State of Wisconsin, have invented certain new and useful Improvements in Direction-Indicators, of which the following is a specification.

This invention relates to indicators specially designed for attachment to motor vehicles for indicating the intended course of the driver of the vehicle.

An object of the invention is the provision of an indicating device embodying a pair of winding rolls and a strip of fabric wound thereon adapted to be moved across an opening in a suitable casing for indicating the intended course of the driver of the vehicle.

Another object is the provision of a device of this character embodying a spring actuated roll for winding the indicating fabric and a flexible connection adapted to be extended to a point for convenient operation by the driver of the vehicle.

With these and other objects in view, the invention consists in the novel construction, arrangement and formation of parts as will be hereinafter specifically described, claimed and illustrated in the accompanying drawings, in which, Figure 1 represents a transverse sectional view of my improved indicating device, Fig. 2 represents a transverse sectional view showing the partition wall and board, Fig. 3 represents a detail enlarged sectional view taken through the spring actuated winding roller for the indicating cloth, Fig. 4 is a perspective view of the indicator casing, and Fig. 5 represents a longitudinal sectional view taken through the casing.

Referring to the drawing in detail, wherein similar reference numerals designate corresponding parts throughout the several views, the numeral 10 indicates a suitable casing having a front wall 11 formed with a suitable longitudinal opening 12 behind which is secured a section of transparent material 13 of glass or the like. The front wall 11 at one end of the opening 12 is formed with a circular opening 14 preferably covered with red colored glass to provide a tail or danger light for the vehicle. The casing 1 is formed in its bottom with a longitudinally extending opening 16ª adapted to permit light from the illuminating device to be hereinafter described to reflect on the license number carried by the motor vehicle to which the indicating device is attached.

At the ends of the opening 12 in the front wall 11 of the casing the latter is provided with partitions 16 and 17. The partition 17 divides the casing into a light containing compartment 18 and the roller containing compartment 19 the opposite end wall of which latter is formed by the other partition 16.

Within the compartment 19 upper and lower rollers 20 and 21 respectively, are rotatably mounted on suitable shafts journaled in the partitions 16 and 17. The upper roller 20 is freely rotatable, while the lower roller is actuated to roll the indicating cloth or strip 22 thereon by the tension of the coil spring 23 coiled around the reduced end 24 of a shaft 25 mounted in the partition 17 and secured at one end to the reduced end 24 and at the opposite end to the end wall of the axial recess 26 formed in the end of the lower roller 21 receiving the shaft 25 and its reduced end. The shaft 25 is secured against rotation within the partition 17 by a locking pin 27 extended therethrough and through the adjacent portion of said partition.

The indicating strip 22 is secured at opposite ends to the rollers 20 and 21 and is extended over the rounded edges of the V-shaped board 28, shown in Fig. 5. The boards 28 are arranged in the rear of the opening 12 and are of a greater width than the opening 12. The inclined sides of the boards 28 are presented to the opening 12 and have their upper and lower edges rounded. The inclined faces of the boards 28 reflect the rays from a source of light through the openings of the partition to illuminate a portion of the indicating strip 22 passing thereover. The board 28 is arranged in spaced relation to the transparent material 13 to permit the strip 22 to freely pass thereover, and the partition 17 is formed with a cut away portion 29 permitting the rays of light from an electric or other lamp 30 arranged in the compartment 18 to enter the space between the angular board 28 and the strip 22 whereby the markings of the latter are made clearly visible. It is evident that the V-shaped reflecting board 28 confines the light in a comparatively small space behind the exposed portion of the indicating strip, thus insuring uniform and brilliant illumination of the latter.

The shaft of the top roller 20 is extended into the small compartment 32 at the end of the casing opposite the compartment 18 and is provided with a pulley 33 to one end of which a flexible cable or cord 34 is secured. The opposite end of the cord 34 is extended to a point conveniently near the driver of the vehicle where it may be quickly and conveniently drawn or released to actuate the roller 20 and thus move the strip 22 over the opening 12 in the casing.

What I claim is:—

In a direction indicator, a casing having openings in the front wall thereof, a partition secured within said casing between said openings and dividing the casing into two compartments, said partition provided with a V-shaped opening, a V-shaped board secured in one of the compartments and having its upper and lower longitudinal edges rounded to provide guides, illuminating means in the other compartment, an indicating strip of semi-opaque material extending over the rounded edges of the said V-shaped board, and means arranged behind said board for actuating said strip, said V-shaped board being co-extensive with the V-shaped opening in the partition permitting the rays of light from said illuminating means to enter between said boards and behind said strip.

In testimony whereof I affix my signature in presence of two witnesses.

WILLIAM H. LARSEN.

Witnesses:
CHRISTIAN JOHNSON,
GEORGE WISCHNEWSKY.

Copies of this patent may be obtained for five cents each, by addressing the "Commissioner of Patents, Washington, D. C."